United States Patent [19]

Kaneko et al.

[11] Patent Number: 5,321,741
[45] Date of Patent: Jun. 14, 1994

[54] FACSIMILE APPARATUS FOR DETERMINING COMMUNICATION FAILURE

[75] Inventors: Shigehiko Kaneko; Yuji Hirai, both of Fukuoka, Japan

[73] Assignee: Matsushita Electric Industrial Co., Ltd., Osaka, Japan

[21] Appl. No.: 795,449

[22] Filed: Nov. 21, 1991

[30] Foreign Application Priority Data

Nov. 29, 1990 [JP] Japan .................. 2-333917

[51] Int. Cl.⁵ .................. H04M 11/00; H04N 1/42
[52] U.S. Cl. .................. 379/100; 358/434; 358/436; 358/441; 379/96
[58] Field of Search .................. 379/100, 96, 97, 98, 379/94, 93; 358/441, 434, 436, 442

[56] References Cited

U.S. PATENT DOCUMENTS

| | | | |
|---|---|---|---|
| 4,741,021 | 4/1988 | Kotani et al. .................. | 379/100 |
| 4,920,560 | 4/1990 | Kageyama .................. | 379/100 |

FOREIGN PATENT DOCUMENTS

| | | | |
|---|---|---|---|
| 0046359 | 2/1989 | Japan .................. | 379/100 |
| 0065964 | 3/1989 | Japan .................. | 379/100 |
| 0089855 | 4/1989 | Japan .................. | 379/100 |
| 0181369 | 7/1989 | Japan .................. | 379/100 |
| 0079548 | 3/1990 | Japan .................. | 379/100 |
| 0213045 | 9/1991 | Japan .................. | 379/100 |

Primary Examiner—Curtis Kuntz
Assistant Examiner—Stella L. Woo
Attorney, Agent, or Firm—Lowe, Price, LeBlanc & Becker

[57] ABSTRACT

An automatic dial device transmits a dial signal to a telephone line. A facsimile signal receiver serves to receive a response facsimile signal from the telephone line. An image signal is transmitted from an image data store unit to the telephone line in cases where the facsimile signal receiver receives a response facsimile signal during a predetermined period after the automatic dial device transmits a dial signal. The telephone line is opened in cases where a busy signal is detected by a busy signal detector during the predetermined period after the automatic dial device transmits a dial signal. The telephone line is opened in cases where the busy signal detector continues to not detect a busy signal during the predetermined period after the automatic dial device transmits a dial signal. A communication failure is indicated in cases where the busy signal detector continues to not detect a busy signal during the predetermined period after the automatic dial device transmits a dial signal.

10 Claims, 2 Drawing Sheets

FACSIMILE APPARATUS FOR DETERMINING COMMUNICATION FAILURE

BACKGROUND OF THE INVENTION

1. Field of the Invention

This invention relates to a facsimile apparatus generally connected to a telephone line.

2. Description of the Prior Art

It is well-known that facsimile apparatuses are connected via modems to telephone lines to execute communication therebetween via the telephone lines.

Some advanced facsimile apparatuses have the function of automatic transmission. In the case where the user selects the function of automatic transmission, data representing image information to be transmitted is stored into a memory, and a dial signal representing a designated telephone number is automatically transmitted. When the connection to the opposite party (the other party) identified by the designated telephone number is established, the data is automatically transmitted from the memory to the opposite party. If the connection to the opposite party fails to be established, a given time is waited and then the dial signal is automatically transmitted again. As long as the connection to the opposite party remains unestablished, the transmission of the dial signal is automatically reiterated a given number of times.

In the case where the designated telephone number is wrong so that the opposite party identified by the designated telephone number has only a general telephone set, even if the connection to the opposite party is established, the connection is soon broken by the opposite party since no voice is transmitted to the opposite party. After the connection to the opposite party is broken, the dial signal is automatically transmitted again. In this case, such a reiterative transmission of the dial signal gives an annoyance to the opposite party.

SUMMARY OF THE INVENTION

It is an object of this invention to provide an improved facsimile apparatus.

A first aspect of this invention provides a facsimile apparatus comprising first means for storing an image signal; second means for detecting a busy signal inputted from a telephone line; third means for transmitting a dial signal to the telephone line; fourth means for receiving a response facsimile signal from the telephone line; fifth means for transmitting the image signal from the first means to the telephone line in cases where the fourth means receives a response facsimile signal during a predetermined period after the third means transmits a dial signal; sixth means for opening the telephone line in cases where the second means detects a busy signal during the predetermined period after the third means transmits a dial signal; seventh means for opening the telephone line in cases where the second means continues to not detect a busy signal during the predetermined period after the third means transmits a dial signal; and eighth means for indicating a communication failure in cases where the second means continues to not detect a busy signal during the predetermined period after the third means transmits a dial signal.

A second aspect of this invention provides a facsimile apparatus comprising first means for reading out an image and converts the readout image into a corresponding image signal; second means for storing the image signal; third means for detecting a busy signal inputted from a telephone line; fourth means for transmitting a dial signal to the telephone line; fifth means for receiving a response facsimile signal from the telephone line; sixth means for transmitting the image signal from the second means to the telephone line in cases where the fifth means receives a response facsimile signal during a predetermined period after the fourth means transmits a dial signal; seventh for opening the telephone line in cases where the third means detects a busy signal during the predetermined period after the fourth means transmits a dial signal; eighth means for opening the telephone line in cases where the third means continues to not detect a busy signal during the predetermined period after the fourth means transmits a dial signal; and ninth means for indicating a communication failure in cases where the third means continues to not detect a busy signal during the predetermined period after the fourth means transmits a dial signal.

A third aspect of this invention provides a facsimile apparatus comprising first means for reading out an image and converts the readout image into a corresponding image signal; second means for storing the image signal; third means for detecting a busy signal inputted from a telephone line; fourth means for transmitting a dial signal to the telephone line, the dial signal corresponding to an opposite party of communication; fifth means for receiving a response facsimile signal from the telephone line; sixth means for transmitting the image signal from the second means to the telephone line in cases where the fifth means receives a response facsimile signal during a predetermined period after the fourth means transmits a dial signal; seventh means for opening the telephone line in cases where the third means detects a busy signal during the predetermined period after the fourth means transmits a dial signal; eighth means for opening the telephone line in cases where the third means continues to not detect a busy signal and the fifth means continues to not receive a response facsimile signal during the predetermined period after the fourth means transmits a dial signal; and ninth means for indicating a communication failure and information of the opposite party corresponding to the dial signal in cases where the third means continues to not detect a busy signal and the fifth means continues to not receive a response facsimile signal during the predetermined period after the fourth means transmits a dial signal.

A fourth aspect of this invention provides a facsimile apparatus connected to a telephone line, comprising first means for transmitting a dial signal to the telephone line; second means for receiving a response facsimile signal from the telephone line; third means for opening the telephone line in cases where the second means continues to not detect a response facsimile signal during a predetermined period after the first means transmits a dial signal; and fourth means for inhibiting the first means from transmitting the dial signal again in cases where the second means continues to not detect a response facsimile signal during the predetermined period after the first means transmits the dial signal.

DESCRIPTION OF THE PREFERRED EMBODIMENT

Figure 1:
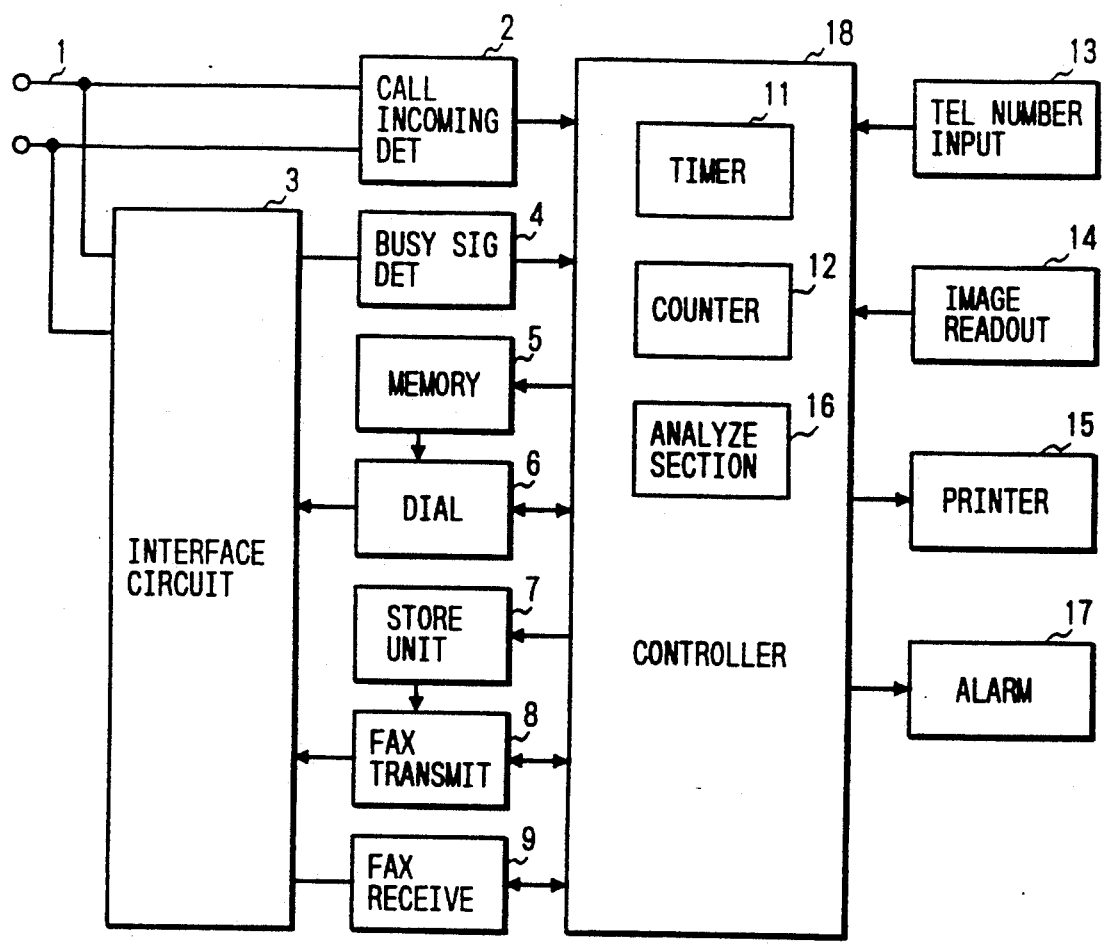
FIG. 1 is a block diagram of a facsimile apparatus according to an embodiment of this invention.

With reference to FIG. 1, a facsimile apparatus includes a call incoming signal detector 2 and an interface circuit 3 which are connected to a pair of telephone lines 1. The facsimile apparatus also includes a busy signal detector 4, a memory 5, an automatic dial device 6, an image data store unit 7, a facsimile signal transmitter 8, a facsimile signal receiver 9, a telephone number input device 13, an image readout device 14, a printer 15, an alarm device 17, and a controller 18. The devices 2, 5, 7, 13, 14, 15, and 17 are connected to the controller 18. The devices 4, 6, 8, and 9 are connected between the interface circuit 3 and the controller 18. The memory 5 is connected to the controller 18 and the automatic dial device 6. The image data store unit 7 is connected to the controller 18 and the facsimile signal transmitter 8.

In the case where a dial signal is transmitted, when the opposite party (the other party) is busy, a telephone exchange returns a busy signal. Such a busy signal is further transmitted from the telephone lines 1 to the busy signal detector 4 via the interface circuit 3, and is detected by the detector 4. The busy signal detector 4 informs the controller 18 of the detection of a busy signal.

Data representing a designated telephone number can be inputted into the controller 18 via the telephone number input device 13. The telephone number data is stored into the memory 5 from the controller 18. The memory 5 feeds the telephone number data to the automatic dial device 6 in response to an instruction from the controller 18. The automatic dial device 6 converts the telephone number data into a corresponding dial signal, and transmits the dial signal to the telephone lines 1 via the interface circuit 3 in response to an instruction from the controller 18.

Data representing an image to be transmitted can be fed to the controller 18 from the image readout device 14. The image data is stored into the image data store unit 7 from the controller 18. The image data store unit 7 feeds the image data to the facsimile signal transmitter 8 in response to an instruction from the controller 18. The facsimile signal transmitter 8 converts the image data into a corresponding facsimile signal, and transmits the facsimile signal to the telephone lines 1 via the interface circuit 3 in response to an instruction from the controller 18.

A facsimile signal outputted from another facsimile apparatus is conducted to the facsimile signal receiver 9 via the telephone lines 1 and the interface circuit 3. The facsimile signal is received by the facsimile signal receiver 9, and is converted by the facsimile signal receiver 9 into corresponding image data. The facsimile signal receiver 9 feeds the image data to the controller 18, and the controller 18 controls the printer 15 in response to the image data so that a corresponding image will be reproduced on a printing sheet. In addition, the printer 15 can print out a communication result report in compliance with an instruction from the controller 18.

The controller 18 includes a timer 11, a counter 12, and a section 16 for analyzing the cause of a communication impossibility (a communication failure). In the event of a communication impossibility, the analyzing section 16 is activated to detect or decide the cause of the communication impossibility, and an appropriate process is done in accordance with the detected cause.

The alarm device 17 is controlled by the controller 18. The alarm device 17 includes a buzzer.

A description will now be given of a preliminary process followed by an automatic transmission process. When the user inputs telephone number data into the controller 18 via the telephone number input device 13, the controller 18 stores the telephone number data into the memory 5. Then, documents having information to be transmitted are fed to the image readout device 14 in compliance with an instruction from the user, and an image of the documents is converted by the image readout device 14 into corresponding image data including the transmitted information. The image readout device 14 feeds the image data to the controller 18. The controller 18 stores the image data into the image data store unit 7. In this way, the preliminary process is completed. Subsequently, the automatic transmission process is started.

Figure 2:
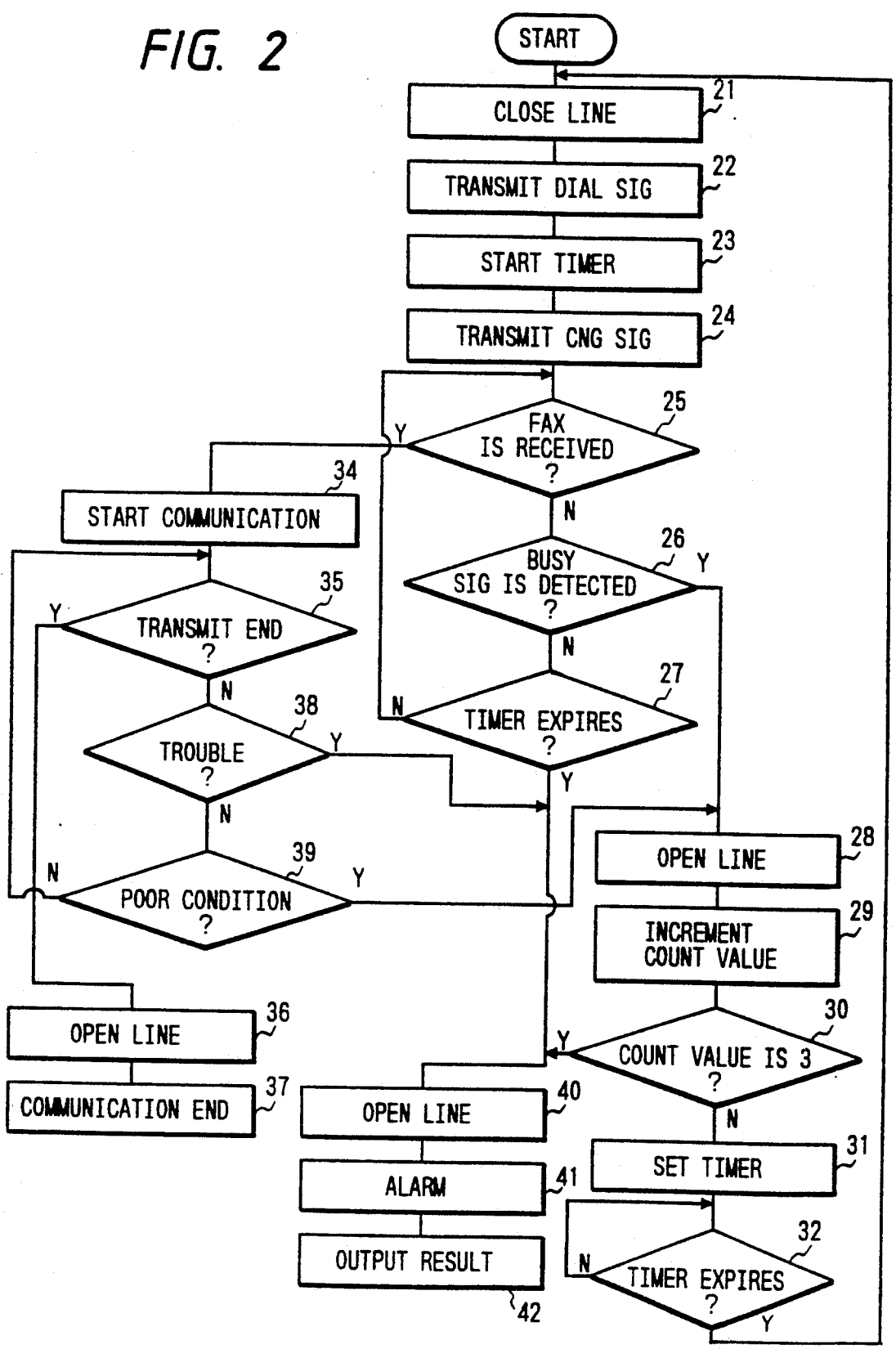
FIG. 2 is a flowchart of a portion of a program operating the controller of FIG. 1.

The controller 18 includes a microcomputer having a combination of a processing section, a ROM, a RAM, and an input/output section. The controller 18 operates in accordance with a program stored in the ROM. FIG. 2 is a flowchart of a portion of the program which relates to the automatic transmission process.

As shown in FIG. 2, a first step 21 of the portion of the program controls the interface circuit 3 so that the interface circuit 3 will close the telephone lines 1. A step 22 following the step 21 controls the memory 5 so that the memory 5 will feed the telephone number data to the automatic dial device 6. In addition, the step 22 controls the automatic dial device 6 so that the automatic dial device 6 will convert the telephone number data into a corresponding dial signal, and the automatic dial device 6 will transmit the dial signal to the telephone lines 1 via the interface circuit 3. When the transmission of the dial signal is completed, the automatic dial device 6 informs the controller 18 of the completion of the transmission of the dial signal. The program advances from the step 22 to a step 23 in response to the information representing the completion of the transmission of the dial signal.

The step 23 starts the timer 11. A step 24 following the step 23 controls the facsimile signal transmitter 8 so that the facsimile signal transmitter 8 will transmit a calling tone signal (a CNG signal) to the telephone lines 1 via the interface circuit 3. After the step 24, the program advances to a step 25.

The step 25 decides whether or not a response facsimile signal is received by referring to the output signal from the facsimile signal receiver 9. It should be noted that the opposite party in a free state (a usable state) generally outputs a response facsimile signal in answer to the CNG signal. When a response facsimile signal is received, the program advances to a step 34. When a response facsimile signal is not received, the program advances to a step 26.

The step 26 decides whether or not a busy signal is received by referring to the output signal from the busy signal detector 4. When a busy signal is detected, the program advances to a step 28. When a busy signal is not received, the program advances to a step 27.

The step 27 decides whether or not a first predetermined time given by the timer 11 has elapsed since the moment of the start of the timer 11 by referring to the output signal from the timer 11. The first predetermined time is equal to, for example, 35 seconds. When the first predetermined time has elapsed, the program advances to a step 40. When the first predetermined time has not elapsed yet, the program returns to the step 25.

The step 28 controls the interface circuit 3 so that the interface circuit 3 will open the telephone lines 1. A step 29 following the step 28 controls the counter 12 so that the count value given by the counter 12 will be incremented by "1". It should be noted that the count value is initialized to 0 before the transmission of the dial signal.

A step 30 following the step 29 detects the output signal from the counter 12 and decides whether or not the count value is equal to 3. When the count value is equal to 3, the program advances to the step 40. When the count value is not equal to 3, the program advances to a step 31.

The step 31 controls the timer 11 so that a second predetermined time will be set in the timer 11. The second predetermined time is equal to, for example, two minutes. A step 32 following the step 31 decides whether or not the second predetermined time has elapsed by referring to the output signal from the timer 11. When the second predetermined time has elapsed, the program returns to the step 21. When the second predetermined time has not elapsed yet, the step 32 is repeated. As a result, the second predetermined time is waited by the step 32.

The step 34 controls the image data store unit 7 and the facsimile signal transmitter 8 to start facsimile communication. Specifically, the step 34 controls the image data store unit 7 so that the image data store unit 7 will feed the image data to the facsimile signal transmitter 8. In addition, the step 34 controls the facsimile signal transmitter 8 so that the facsimile signal transmitter 8 will convert the image data into a corresponding facsimile signal, and the facsimile signal transmitter 8 will transmit the facsimile signal to the telephone lines 1 via the interface circuit 3. After the step 34, the program advances to a step 35.

The step 35 decides whether or not the transmission of the facsimile signal has been completed by referring to the output signal from the facsimile signal transmitter 8. It should be noted that when the transmission of the facsimile signal is completed, the facsimile signal transmitter 8 informs the controller 18 of the completion of the transmission of the facsimile signal. When the transmission of the facsimile signal has been completed, the program advances to a step 36. When the transmission of the facsimile signal has been not completed yet, the program advances to a step 38.

The step 36 controls the interface circuit 3 so that the interface circuit 3 will open the telephone lines 1. A step 37 following the step 36 executes a process of indicating the end of the facsimile communication and the success of the facsimile communication. For this purpose, the printer 15 may be used. After the step 37, the portion of the program is ended.

The step 38 decides whether or not a trouble-representing signal is received by referring to the output signal from the facsimile signal receiver 9. An example of the trouble-representing signal is a signal representing the exhaustion of printing sheets in the opposite party. When a trouble-representing signal is received, the program advances to the step 40. When a trouble-representing signal is not received, the program advances to a step 39.

The step 39 decides whether conditions of the telephone lines 1 are good or poor by referring to the output signal from the facsimile signal receiver 9. Specifically, the step 39 decides whether or not a response signal from the opposite party is received well. It should be noted that the opposite partly generally transmits a response signal during the facsimile communication. When the conditions of the telephone lines 1 are poor, that is, when a response signal is not received well, the program advances to the step 28. When the conditions of the telephone lines 1 are good, that is, when a response signal is received well, the program returns to the step 35.

The step 40 controls the interface circuit 3 so that the interface circuit 3 will open the telephone lines 1. A step 41 following the step 40 activates the alarm device 17 so that the alarm device 17 will output an alarm sound. A step 42 following the step 41 controls the printer 15 so that the printer 15 will print out a communication report indicating the communication failure (the communication impossibility), the cause of the communication failure, and the telephone number of the opposite party related to the communication failure. After the step 42, the portion of the program is ended.

A further description will now be given of the operation of the facsimile apparatus. After the CNG signal is transmitted by the step 24, a decision is made by the steps 25 and 26 as to whether each of a response facsimile signal and a busy signal is received or not. In the case where the opposite party is not in use, the opposite party returns a response facsimile signal in answer to the CNG signal, and the response facsimile signal is detected by the step 25 so that facsimile communication is started by the step 34. In the case where the opposite party is already in use, a busy signal is returned, and the busy signal is detected by the step 26 so that the telephone lines 1 are opened by the step 28. As long as neither a response facsimile signal nor a busy signal is detected, the steps 25 and 26 continue to be repeated during the first predetermined time given by the timer 11.

In the case where neither a response facsimile signal nor a busy signal remains detected and the first predetermined time has elapsed, the facsimile apparatus recognizes the occurrence of a failure (an impossibility) of communication with the opposite party at the step 27. In this case, the telephone lines 1 are opened by the step 40, and then an alarm sound is generated by the step 41. In addition, a communication result report indicating the communication failure is outputted by the step 42.

As described previously, in the case where a busy signal is detected by the step 26, the telephone lines 1 are opened by the step 28. Then, the second predetermined time given by the timer 11 is waited by the step 32, and the transmission of the dial signal and the CNG signal is executed again. Subsequently, the steps 25 and 26 are executed again. These process are repeated at most three times by the operation of the steps 29 and 30.

In the case where a trouble-representing signal, for example, a signal representing the exhaustion of printing sheets in the opposite party, is detected by the step 35 during the facsimile communication, the telephone lines 1 are opened by the step 40, and then an alarm sound is generated by the step 41. Furthermore, a communication result report indicating the trouble is outputted by the step 42.

In the case where poor conditions of the telephone lines 1 are detected by the step 39 during the facsimile communication, the telephone lines 1 are opened by the step 28, and then the second predetermined time given by the timer 11 is waited by the step 32. Subsequently, the transmission of the dial signal and the CNG signal is executed again to restart facsimile communication.

An example of the communication failure (the communication impossibility) recognized by the step 27 results from the fact that the opposite party is in trouble and does not return a response facsimile signal. Another example of the communication failure (the communication impossibility) results from the fact that the designated telephone number is wrong and the opposite party identified by the designated telephone number has only a general telephone set. As described previously, in the event of such a communication failure (a communication impossibility), the telephone lines 1 are opened by the step 40, and then an alarm sound is generated by the step 41. Furthermore, a communication result report indicating the communication failure is outputted by the step 42. The alarm sound and the communication report inform the user that the designated telephone number may be wrong or the opposite party may be in trouble. Thus, the user is encouraged to take a suitable step such as a step of checking the designated telephone number, or a step of confirming conditions of the opposite party. Since the program portion of FIG. 2 is ended after the step 42, a second transmission of the dial signal is prevented. In the case where the designated telephone number is wrong and the opposite party identified by the designated telephone number has only a general telephone set, the prevention of the second transmission of the dial signal decreases an annoyance to the opposite party.

It should be noted that this embodiment may be modified in various ways. For example, while the busy signal detector 4 and the timer 11 are used in judging a signal inputted from the telephone lines 1 after the transmission of a dial signal in this embodiment, a ring back tone signal and a timer may be used in place of the busy signal detector 4 and the timer 11.

What is claimed is:

1. A facsimile apparatus comprising:
   first means for storing an image signal;
   second means for detecting a busy signal inputted from a telephone line;
   third means for transmitting a dial signal to the telephone line;
   fourth means for receiving a response facsimile signal from the telephone line;
   fifth means for transmitting the image signal from the first means to the telephone line in cases where the fourth means receives a response facsimile signal during a predetermined period after the third means transmits a dial signal;
   sixth means for opening the telephone line in cases where the second means detects a busy signal during the predetermined period after the third means transmits a dial signal;
   seventh means for opening the telephone line in cases where the second means continues to not detect a busy signal during the predetermined period after the third means transmits a dial signal and a response facsimile signal is not received; and
   eighth means for visually indicating a communication failure in cases where the second means continues to not detect a busy signal and the response facsimile signal is not received during the predetermined period after the third means transmits a dial signal.

2. A facsimile apparatus comprising:
   first means for reading out an image and converts the readout image into a corresponding image signal;
   second means for storing the image signal;
   third means for detecting a busy signal inputted from a telephone line;
   fourth means for transmitting a dial signal to the telephone line;
   fifth means for receiving a response facsimile signal from the telephone line;
   sixth means for transmitting the image signal from the second means to the telephone line in cases where the fifth means receives a response facsimile signal during a predetermined period after the fourth means transmits a dial signal;
   seventh means for opening the telephone line in cases where the third means detects a busy signal during the predetermined period after the fourth means transmits a dial signal;
   eighth means for opening the telephone line in cases where the third means continues to not detect a busy signal during the predetermined period after the fourth means transmits a dial signal and a response facsimile signal is not received; and
   ninth means for visually indicating a communication failure in cases where the third means continues to not detect a busy signal and the response facsimile signal is not received during the predetermined period after the fourth means transmits a dial signal.

3. A facsimile apparatus comprising:
   first means for reading out an image and converts the readout image into a corresponding image signal;
   second means for storing the image signal;
   third means for detecting a busy signal inputted from a telephone line;
   fourth means for transmitting a dial signal to the telephone line, the dial signal corresponding to an opposite party of communication;
   fifth means for receiving a response facsimile signal from the telephone line;
   sixth means for transmitting the image signal from the second means to the telephone line in cases where the fifth means receives a response facsimile signal during a predetermined period after the fourth means transmits a dial signal;
   seventh means for opening the telephone line in cases where the third means detects a busy signal during the predetermined period after the fourth means transmits a dial signal;
   eighth means for opening the telephone line in cases where the third means continues to not detect a busy signal and the fifth means continues to not receive a response facsimile signal during the predetermined period after the fourth means transmits a dial signal; and
   ninth means for visually indicating a communication failure and information of the opposite party corresponding to the dial signal in cases where the third means continues to not detect a busy signal and the fifth means continues to not receive a response facsimile signal during the predetermined period after the fourth means transmits a dial signal.

4. A facsimile apparatus connected to a telephone line, comprising:
   first means for transmitting a dial signal to the telephone line;
   second means for receiving a response facsimile signal from the telephone line;
   third means for opening the telephone line in cases where the second means continues to not detect a response facsimile signal during a predetermined period after the first means transmits a dial signal;

fourth means for inhibiting the first means from transmitting the dial signal again in cases where the second means continues to not detect a response facsimile signal during the predetermined period after the first means transmits the dial signal; and means for visually indicating a communication failure in cases where the second means continues to not detect a response facsimile signal during the predetermined period after the first means transmits the dial signal.

5. The facsimile apparatus of claim 4 further comprising means for generating an alarm in cases where the second means continues to not detect a response facsimile signal during the predetermined period after the first means transmits the dial signal.

6. The facsimile apparatus of claim 4 further comprising fifth means for receiving a busy signal from the telephone line, and wherein the third means comprises means for opening the telephone line in cases where the second means continues to not detect a response facsimile signal and the fifth means continues to not receive a busy signal during the predetermined period after the first means transmits a dial signal, and wherein the fourth means comprises means for inhibiting the first means from transmitting the dial signal again in cases where the second means continues to not detect a response facsimile signal and the fifth means continues to not receive a busy signal during the predetermined period after the first means transmits the dial signal.

7. The facsimile apparatus of claim 6 further comprising means for enabling the first means to transmit the dial signal again in cases where the fifth means receives a busy signal during the predetermined period after the first means transmits the dial signal.

8. A facsimile apparatus connected to a telephone line, comprising:

first means for transmitting a dial signal to the telephone line;

second means for detecting whether or not a response facsimile signal is received from the telephone line after the first means transmits the dial signal to the telephone line;

third means for, in cases where the second means does not detect the response facsimile signal after the first means transmits the dial signal to the telephone line, analyzing a cause of undetection of the response facsimile signal by the second means; and fourth means for selectively enabling the first means to transmit the dial signal again and inhibiting the first means from transmitting the dial signal again in response to a result of the analyzing by the third means wherein the third means comprise fifth means for detecting whether or not the second means continues to not detect the response facsimile signal during a predetermined period after the first means transmits the dial signal, and sixth means for visually indicating a communication failure in cases where the fifth means detects that the second means continues to not detect the response facsimile signal during the predetermined period after the first means transmits the dial signal.

9. A facsimile apparatus connected to a telephone line, comprising:

first means for transmitting a dial signal to the telephone line;

second means for detecting whether or not a response facsimile signal is received from the telephone line after the first means transmits the dial signal to the telephone line;

third means for, in cases where the second means does not detect the response facsimile signal after the first means transmits the dial signal to the telephone line, analyzing a cause of undetection of the response facsimile signal by the second means; and fourth means for selectively enabling the first means to transmit the dial signal again and inhibiting the first means from transmitting the dial signal again in response to a result of the analyzing by the third means wherein the third means comprise fifth means for detecting whether not the second means continues to not detect the response facsimile signal during a predetermined period after the first means transmits the dial signal, and sixth means for generating an alarm in cases where the fifth means detects that the second means continues to not detect the response facsimile signal during the predetermined period after the first means transmits the dial signal.

10. A facsimile apparatus connected to a telephone line, comprising:

first means for transmitting a dial signal to the telephone line;

second means for detecting a response facsimile signal coming from the telephone line;

third means for detecting a busy signal coming from the telephone line;

fourth means for opening the telephone line and inhibiting the first means for transmitting the dial signal again in cases where the second means continues to not detect a response facsimile signal coming from the telephone line and the third means continues to not detect a busy signal coming from the telephone line during a predetermined period after the first means transmits the dial signal;

fifth means for visually indicating a communication failure in cases where the second means continues to not detect a response facsimile signal coming from the telephone line and the third means continues to not detect a busy signal coming from the telephone line during the predetermined period after the first means transmits the dial signal; and sixth means for enabling the first means to transmit the dial signal again when the third means detects a busy signal coming from the telephone line.

* * * * *